(12) United States Patent
Eaton

(10) Patent No.: US 10,499,103 B2
(45) Date of Patent: Dec. 3, 2019

(54) TELEVISION RECEIVER PRIVACY CONTROL

(71) Applicant: DISH UKRAINE L.L.C., Kharkov (UA)

(72) Inventor: Zane Eaton, Kharkov (UA)

(73) Assignee: DISH UKRAINE L.L.C., Kharkov (UA)

( * ) Notice: Subject to any disclaimer, the term of this patent is extended or adjusted under 35 U.S.C. 154(b) by 0 days.

(21) Appl. No.: 15/536,051

(22) PCT Filed: Dec. 23, 2014

(86) PCT No.: PCT/UA2014/000134
§ 371 (c)(1),
(2) Date: Jun. 14, 2017

(87) PCT Pub. No.: WO2016/105320
PCT Pub. Date: Jun. 30, 2016

(65) Prior Publication Data
US 2017/0339448 A1   Nov. 23, 2017

(51) Int. Cl.
*H04N 21/431* (2011.01)
*H04N 21/442* (2011.01)
*H04N 21/485* (2011.01)
*H04N 21/436* (2011.01)
*H04N 21/414* (2011.01)
(Continued)

(52) U.S. Cl.
CPC ......... *H04N 21/4318* (2013.01); *H04N 5/765* (2013.01); *H04N 9/8205* (2013.01); *H04N 21/4104* (2013.01); *H04N 21/4126* (2013.01); *H04N 21/41407* (2013.01); *H04N 21/435* (2013.01); *H04N 21/436* (2013.01); *H04N 21/4367* (2013.01); *H04N 21/43615* (2013.01); *H04N 21/44204* (2013.01); *H04N 21/44213* (2013.01); *H04N 21/44236* (2013.01); *H04N 21/4516* (2013.01); *H04N 21/4532* (2013.01); *H04N 21/475* (2013.01);
(Continued)

(58) Field of Classification Search
CPC .......... H04N 21/4104; H04N 21/4126; H04N 21/41407; H04N 21/4318; H04N 21/436; H04N 21/43615; H04N 21/4367; H04N 21/44236; H04N 21/475; H04N 21/485; H04N 21/632
See application file for complete search history.

(56) References Cited

U.S. PATENT DOCUMENTS 7,904,924 B1 * 3/2011 de Heer ............. H04N 21/4532
705/347
2002/0184457 A1 * 12/2002 Yuasa ................ H04N 21/4147
711/161
(Continued)

FOREIGN PATENT DOCUMENTS

| EP | 1 783 654 A1 | 5/2007 |
|---|---|---|
| GB | 2 491 634 A | 12/2012 |
| WO | 2016/105320 A1 | 6/2016 |

OTHER PUBLICATIONS

International Search Report and Written Opinion for PCT/UA2014/000134 dated Jul. 1, 2015, all pages.

*Primary Examiner* — Jeremy S Duffield

(57) ABSTRACT

Controlling or limiting visibility into particular metadata associated with the transfer of media content from a source device or system to a receiving device or system.

15 Claims, 8 Drawing Sheets

(51) Int. Cl.
  *H04N 21/4367*  (2011.01)
  *H04N 21/41*    (2011.01)
  *H04N 21/475*   (2011.01)
  *H04N 21/63*    (2011.01)
  *H04N 21/45*    (2011.01)
  *H04N 21/84*    (2011.01)
  *H04N 21/435*   (2011.01)
  *H04N 5/765*    (2006.01)
  *H04N 9/82*     (2006.01)

(52) U.S. Cl.
  CPC ......... *H04N 21/485* (2013.01); *H04N 21/632* (2013.01); *H04N 21/84* (2013.01)

(56) References Cited

U.S. PATENT DOCUMENTS

| | | | |
|---|---|---|---|
| 2008/0166103 A1* | 7/2008 | Tajime | G11B 20/00086 |
| | | | 386/253 |
| 2010/0169343 A1* | 7/2010 | Kenedy | G06F 17/30867 |
| | | | 707/758 |
| 2011/0162020 A1* | 6/2011 | Kahn | H04N 21/4263 |
| | | | 725/82 |
| 2012/0278830 A1* | 11/2012 | Khoshgozaran | |
| | | | H04N 21/25866 |
| | | | 725/25 |
| 2013/0036363 A1 | 2/2013 | Johnson | |
| 2014/0330951 A1* | 11/2014 | Sukoff | H04N 21/43615 |
| | | | 709/223 |

* cited by examiner

TELEVISION RECEIVER PRIVACY CONTROL

CROSS-REFERENCE TO RELATED APPLICATIONS

This application is a U.S. National Stage of PCT International Application No. PCT/UA2014/000134, filed on Dec. 23, 2014, entitled "Television Receiver Privacy Control," which is hereby incorporated by reference in its entirety.

BACKGROUND

The advent of the digital video recorder, multi-tuner television receiver, and the availability of high-capacity and affordable computer-readable storage devices have made available many possibilities to television programming service providers and viewers alike. In addition, viewers have come to expect flexibility and convenience with respect to the accessing of content via their television receivers.

SUMMARY

In an aspect, a method may include or comprise: receiving, at a television receiver, a request to access particular media content from a computing device over a network interface; streaming, by the television receiver, the particular media content to the computing device over the network interface; and obscuring, by the television receiver, particular metadata that is descriptive of the particular media content so that when output by the television receiver to a presentation device for display the particular metadata is non-descriptive of the particular media content.

In an aspect, a television receiver may include or comprise: a network interface; a processor; and a memory element communicatively coupled with and readable by the processor, and having stored therein processor-readable instructions that when executed cause the processor to: transfer particular media content to a computing device over the network interface; and obscure particular metadata that is generated based upon the transfer and that is descriptive of the particular media content so that when output by the television receiver to a presentation device for display the particular metadata is non-descriptive of the particular media content.

In an aspect, a method may include or comprise: receiving, at a satellite television receiver, a request to access particular media content; streaming, by the satellite television receiver, the particular media content to a computing device over a network interface; and outputting, by the satellite television receiver for display by a presentation device, an interface that includes an identifier of the particular media content when a metadata obfuscation algorithm implemented by the satellite television receiver is disabled, and that obscures the identifier of the particular media content when the metadata obfuscation algorithm implemented by the satellite television receiver is enabled.

Other aspects are possible.

DETAILED DESCRIPTION

Figure 1:
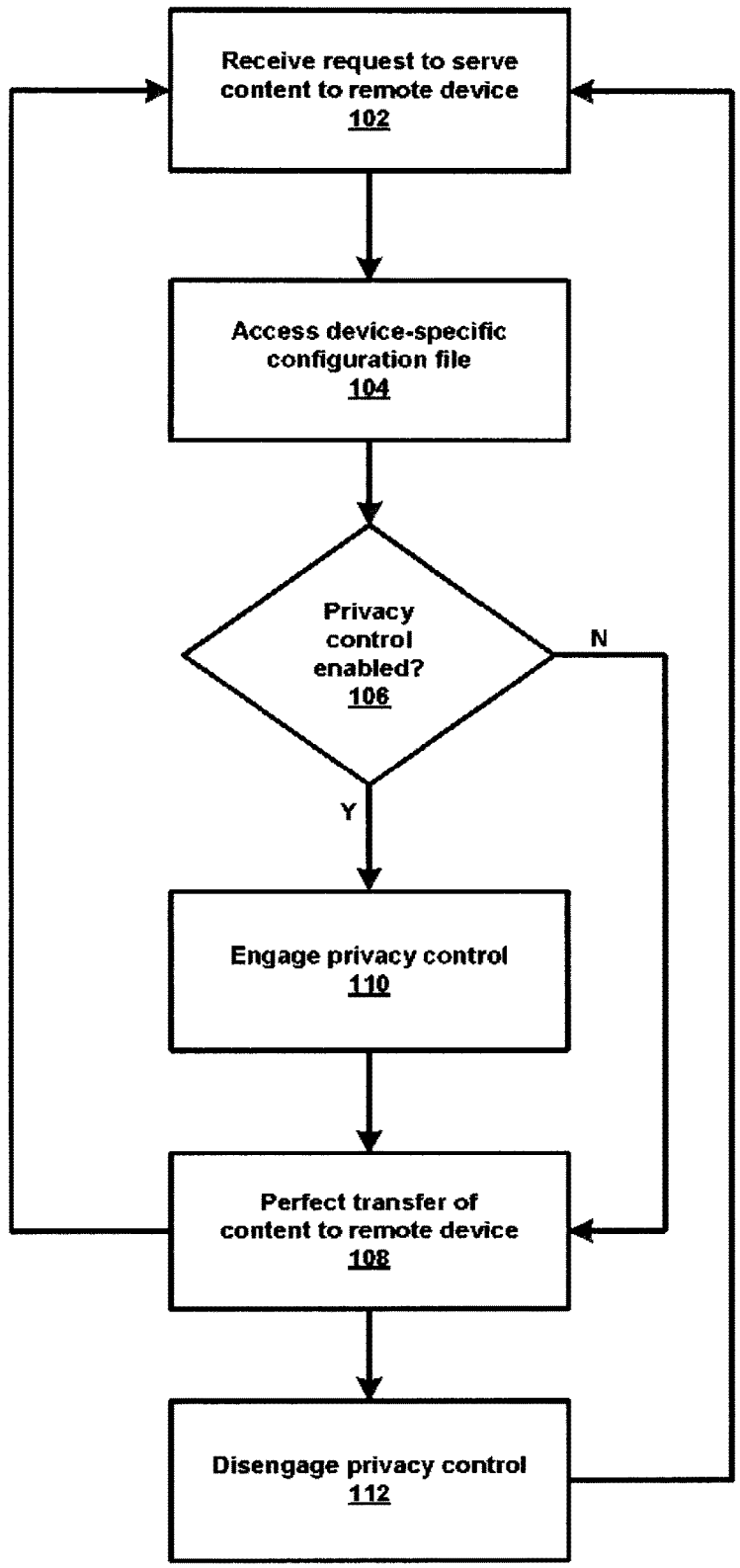
FIG. 1 shows a first example method according to the disclosure.

The present disclosure is generally directed to or towards systems and methods for controlling or limiting visibility into particular metadata associated with the transfer of media content from a source device or system to a receiving device or system. It is contemplated that such a privacy control mechanism may be user-configurable on a per-device or device-specific basis. It is further contemplated that the applicability of such an implementation is far and wide-reaching. For example, it is contemplated that the features or aspects of the present disclosure may be applicable to the satellite television industry.

For instance, a particular television receiver may include or otherwise exhibit one or more logical modules configured and/or arranged to implement a television steaming media functionality that encodes video into a particular format for transmission over the Internet, such as to allow users to remotely view and control a home cable, satellite, or personal video recorder system from an Internet-enabled computer with a broadband Internet connection. Slingbox® by Sling Media, Inc. of Foster City, Calif., is one example of a product that implements such functionality. In this example, it is contemplated that when certain content is served from the television receiver to any particular compatibly-configured device, such as a smartphone for instance, the television receiver itself may obscure, or mask, or hide particular metadata that uniquely identifies the certain content, that which might typically be readily accessible, so that a party other than an individual using the smartphone is unable to identify or otherwise make a determination that the certain content is or has been served to the smartphone from the television receiver. Such a privacy control mechanism may be beneficial and/or advantageous in many respects.

For example, an end-user in many instances may not necessarily want or need others to become aware of the specific type of content being accessed via the particular television receiver. From a different perspective, such an implementation may, among other things, serve to entice new customers to subscribe to services as offered by a particular satellite television provider, as well as provide an incentive for existing customers to maintain their loyalty and/or relationship with the particular satellite television provider. Although not so limited, an appreciation of the various aspects of the present disclosure may be gained from the following discussion in connection with the drawings. For instance, referring now to FIG. 1, a first example method 100 is shown in accordance with the present disclosure.

At step 102, a particular television receiver may receive a request from a smartphone, for example, to serve particular media content to the smartphone over a network or network connection. Other examples are possible. For instance, it is contemplated that the television receiver may receive the request from any type or form of media player configured and/or arranged to receive and output to an end-user the particular media content. At step 104, the television receiver may in response to the request access a configuration file that is uniquely associated with the smartphone. Here, it is contemplated that the configuration file may or may not be populated with one or more privacy control definitions such as that discussed in the context of the present disclosure. For example, the configuration file may include a parameter, definition, or the like, that specifies or indicates that visibility into particular metadata associated with the transfer of any particular media content from the television receiver to the smartphone is to be limited or otherwise access-restricted, so that a party other than an individual using the smartphone is unable to identify or otherwise make a determination that the particular media content is or will been served to the smartphone from the television receiver.

For example, at step 106, the television receiver may make a determination as to whether or not the configuration file that is associated with the smartphone includes or otherwise exhibits such a privacy control setting or parameter. When, for instance, the television receiver makes a determination that the configuration file that is associated with the smartphone does not include or otherwise exhibit such a privacy control setting or parameter, process flow within the method 100 may branch to step 108. At step 108, the television receiver may perfect or otherwise complete the transfer of the particular media content to the smartphone over the network connection. Process flow within the method 100 may then branch back to step 102. Such a branch is intended to show that flow within the method 100 is continuous, whereby the television receiver may receive a request from any particular compatibly-configured device or system to serve particular media content to the same over any particular network or network connection.

When, however, the television receiver at step 106 makes a determination that the configuration file that is associated with the smartphone does include or otherwise exhibit such a privacy control setting or parameter, process flow within the method 100 may branch to step 110. At step 110, the television receiver may engage or otherwise activate a privacy control mechanism in accordance with the present disclosure, so as to control visibility into particular metadata associated with the transfer of the particular media content from the television receiver to the smartphone, so that a party other than an individual using the smartphone is unable to identify or otherwise make a determination that the particular media content is or will been served to the smartphone from the television receiver.

For example, in some instances the television receiver may obscure or otherwise mask or hide status of a particular tuner allocated to enable the transfer of the particular media content from the television receiver to the smartphone. For example, status of the particular tuner allocated to enable the transfer of the particular media content from the television receiver to the smartphone might normally or typically when viewed via a particular interface indicate "Source: Tuner A; Receiver: Mobile Device A; Content: Channel A." However, it is contemplated that the television receiver may obscure or otherwise mask such metadata so that the following would be displayed when viewed via the particular interface "Source: Tuner - - - ; Receiver: - - - ; Content: - - - ." Here, even if such information were accessible via the above-mentioned interface a party unauthorized to view such metadata would be unable to identify or otherwise make a determination that "Channel A" is allocated to serve content associated with "Channel A" to the "Mobile Device A" from the particular television receiver. Other examples are possible.

For example, it is contemplated that the television receiver may obscure or otherwise mask the above-mentioned metadata so that the following would be displayed when viewed via the particular interface "Source: Tuner A; Receiver: Mobile Device A; Content: Channel B." Here, even if such information were accessible via the above-mentioned interface a party unauthorized to view such metadata would be unable to identify or otherwise make a determination that "Tuner A" is allocated to serve content associated with "Channel A" to the "Mobile Device A" from the particular television receiver. This is because the displayed metadata indicates that "Tuner A" is allocated to serve content associated with "Channel B" to the "Mobile Device A." Such an implementation may in some instances be referred to as a "spoof" or "spoofing," because the true content being served by the particular television receiver to the smartphone in this example in not displayed or conveyed.

In still other examples, the television receiver may not display any information at all as to the status of a particular tuner allocated to enable the transfer of the particular media content from the television receiver to the smartphone. Rather, such information may be completely "hidden" so that visibility in to such information or metadata is fully restricted. For example, none of what typically or normally might be displayed "Source: Tuner A; Receiver: Mobile Device A; Content: Channel A" would be surfaced to an unauthorized party. This may be considered similar to the above-example "Source: Tuner - - - ; Receiver: - - - ; Content: - - - " but may go a step further so that the following would be displayed when viewed via the particular interface " - - - ; - - - ; - - - ." Still other examples or even permutations are possible.

Following step 110, process flow may proceed to step 108. As mentioned above, at step 108, the television receiver may perfect or otherwise complete the transfer of the particular media content to the smartphone over the network connection. Process flow within the method 100 may then branch back to step 102. Also as mentioned above, such a branch is intended to show that flow within the method 100 is continuous, where the television receiver may receive a request from any particular compatibly configured device or system to serve particular media content to the same over any particular network or network connection. Otherwise flow within the method 100 may branch to step 112 whereby the television receiver may disengage or otherwise deactivate a privacy control mechanism in accordance with the present disclosure.

Such an implementation as discussed in connection with FIG. 1 may be beneficial and/or advantageous in many respects including. For example, such an implementation may enable an end-user to hide or obscure the fact the their device is even being used to access content as served from a particular television receiver. For example, in one scenario the end-user could be streaming media to their device even though the end-user should be doing something else, such as a household chore, etc. Further scenarios and/or beneficial aspects associated with controlling visibility into particular metadata associated with the transfer of media content from a source device or system to a receiving device or system are described in detail below in connection with FIGS. 2-8.

Figure 2:
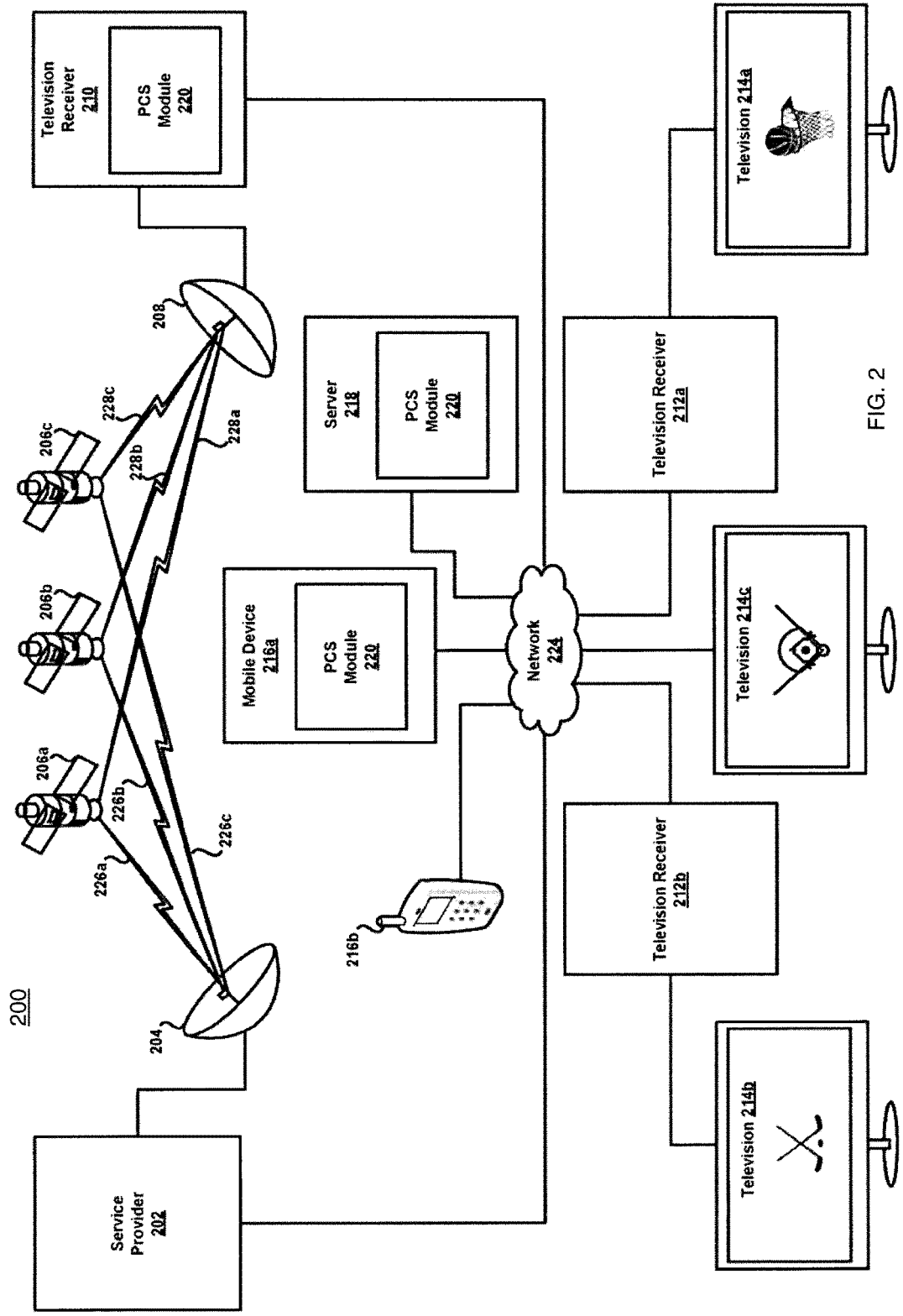
FIG. 2 shows an example content distribution system according to the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media content distribution system as desired.

The example system 200 may include a service provider 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218 that may be associated with the service provider 202. Additionally, at least one of the PTR 210, computing devices 216a-b, and server 218 may include or otherwise exhibit an PCS (Privacy Control Service) module 220. In general, the PCS module 220 may be configured and/or arranged to implement various features or aspects of the present disclose associated with for controlling or limiting visibility into particular metadata associated with the transfer of media content from a source device or system to a receiving device or system. Such features or aspects may be beneficial and/or advantageous in many respects, as may be understood in light of the present disclosure in its entirety.

The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
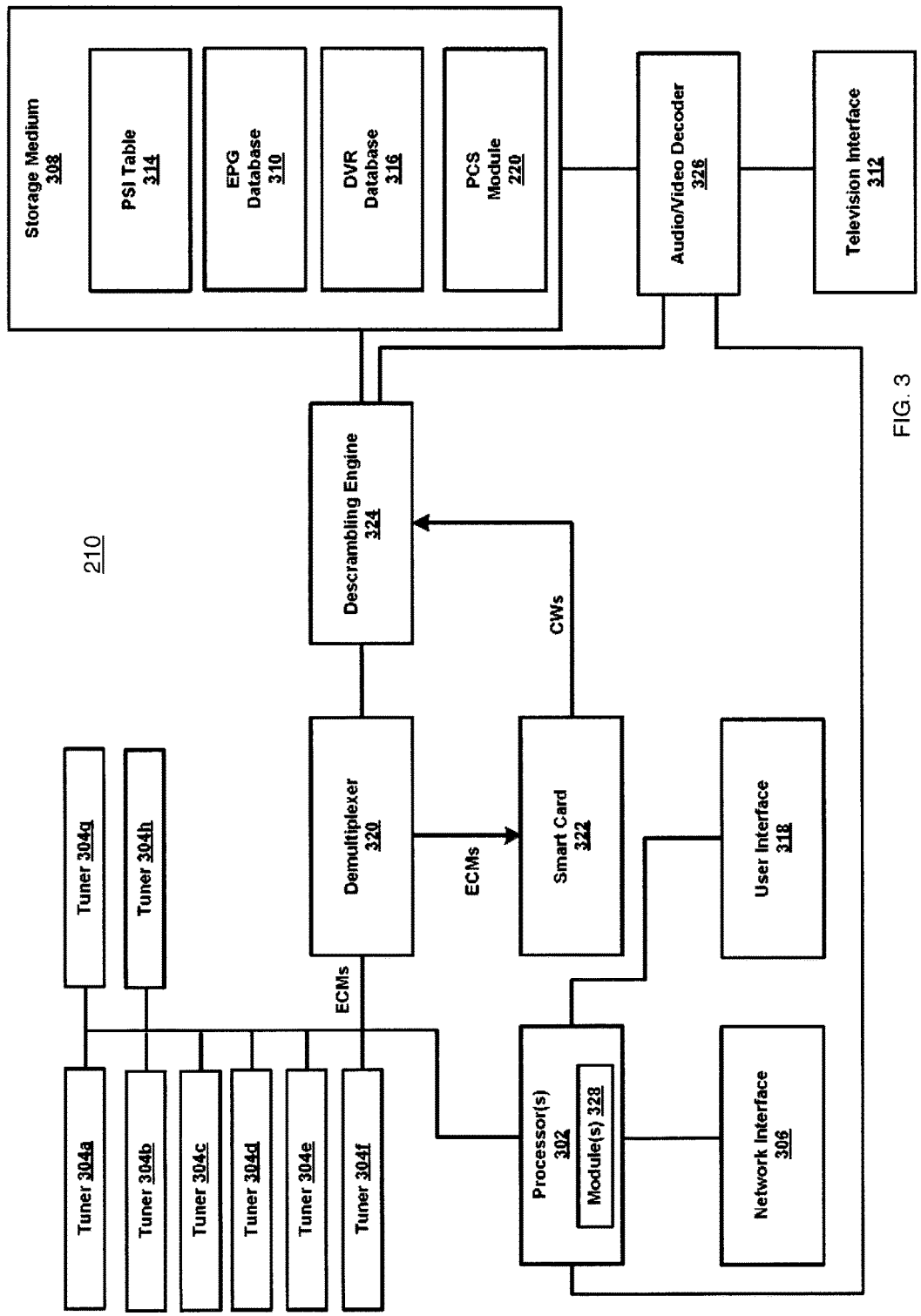
FIG. 3 shows an example block diagram of a television receiver of FIG. 2.

Referring now to FIG. 3, an example block diagram of the PTR 210 of FIG. 2 is shown in accordance with the disclosure. In some examples, the STRs 212a-b may be configured in a manner similar to that of the PTR 210. In some examples, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one modem 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 306a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 306a-c, which may be unidirectional to the PTR 210, and an another communication channel between the service provider 202 and the PTR 210, which may be bidirectional, may be via the network 224. In general, various types of information may be transmitted and/or received via the network interface 306, such as from systems or devices physically remote or separate from the PTR 210 such as that discussed in further detail below in connection with FIG. 8.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the PCS module 220 mentioned above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Mania | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The modem 328 may be used by the PTR 210 as an interface between the digital data of the PTR 210 and the analog signal of a telephone line. It is contemplated that at least the modem 328 may enable the PTR 210 to implement various features and/or aspects associated with responding to inquiries as to a potential status of the one or more individuals within a residence as discussed within the context of the present disclosure.

For brevity, the PTR 210 is depicted in a simplified form, and may generally include more or fewer elements or components as desired, including those configured and/or arranged for implementing various features for controlling or limiting visibility into particular metadata associated with the transfer of media content from a source device or system to a receiving device or system. For example, the PTR 210 is shown in FIG. 3 to include the PCS Module 220 as mentioned above in connection with FIG. 2. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, the PTR 210 may include one or more logical modules 328 configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
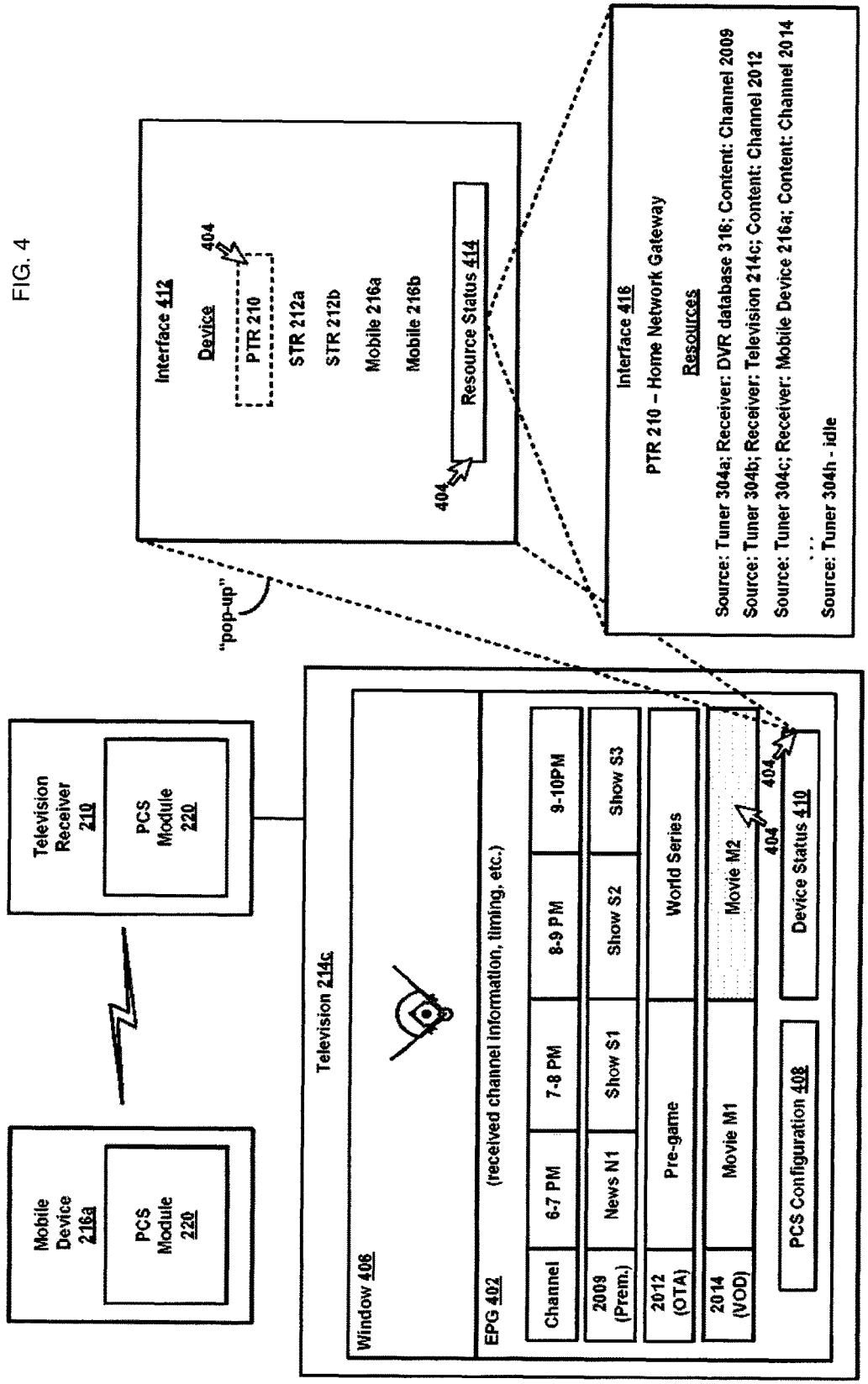
FIG. 4 shows first example aspects of the system of FIG. 2 in detail.

Referring now to FIG. 4, first aspects of the example system 200 of FIG. 2 are shown in detail. In particular, the PTR 210 may be configured to output an EPG (Electronic Programming Guide) 402 to and for presentation the television 214c, for example. The EPG 402 may at least present various information related to television channels and the timing of programs or programming appearing on such television channels. For example, as shown in FIG. 4, the EPG 402 may display information associated with a Channel 2014, where Movie M2 is listed as scheduled to appear on that channel starting at a particular time on a particular day, and etc. In this example, and assuming that a current time is sometime during the time period 8-10 PM, a viewer may manipulate a cursor 404 using a pointing device (not shown) to select, as indicated by stipple shading in FIG. 4, the Movie M2 for immediate viewing within a window 406 on the television 214c. Other examples are possible. For instance, it is contemplated that any menu-driven navigation technique or implementation may be used to enable user-interaction with the EPG 402, along with other elements or interfaces output by the PTR 210 to the television 214c.

In addition to the EPG 402, the PTR 210 may be configured to output various other interactive elements or interfaces. For example, the PCS module 220 of the PTR 210 may be configured to output a configuration selection 408 and a device status selection 410. The configuration selection 408 is discussed in further detail below in connection with at least FIG. 5. The device status selection 410 may be "selected" by an end-user to access a first interface 412 that is shown in FIG. 4. In this example, the first interface 412 may contain a list or listing of devices configured and/or arranged to receive media content, the same of which may be served by the PTR 210 over a network link or connection. For example, assume the PTR 210 is configured and/or arranged to serve as a central controller and access point in a home network and home automation environment within a particular residence, and is itself programmed to, in response to a particular command, serve content over the network 224 to any of the systems or devices as shown in FIG. 2. Here, and as shown in FIG. 4, the first interface 412 may include a list or listing of the following devices authorized to connect, either remotely or locally, to the home network and home automation environment: PTR 210; STR 212a; STR 212b; Mobile Device 216a; Mobile Device 216a. Next, the end-user may select the indicator within the first interface 412 that is associated with the PTR 210, indicated by intermittent line in FIG. 4, and then investigate current or instant status of the tuners 304a-h (see also FIG. 3) of the PTR 210.

For example, following selection of the indicator within the first interface 412 that is associated with the PTR 210, the end-user may manipulate the cursor 404 to select a resource status selection 414 within the first interface 412, via a "point and double-click" action for example, and in response the PCS module 220 of the PTR 210 may output a second interface 416 to and for presentation by the television 214c. In this example, the second interface 416 may include a description or descriptive information associated with the PTR 210, such as "Home Network Gateway." Additionally, the first interface 412 may itemize current or instant status of each of the tuners 304a-h of the PTR 210. For example, the second interface 416 may itemize the information "Source: Tuner 304a; Receiver: DVR database 316; Content: Channel 2009." The end-user may thus discern upon inspection that the tuner 304a is currently or instantly being utilized to record Channel 2009 to the DVR database 316 (see also FIG. 3).

As another example, the second interface 416 may itemize the information "Source: Tuner 304b; Receiver: Television 214c; Content: Channel 2012. An end-user may thus discern upon inspection that the tuner 304b is currently or instantly being utilized to stream Channel 2012 to the television 214c for output or display thereby. As yet another example, the second interface 416 may itemize the information "Source: Tuner 304c; Receiver: Mobile Device 216a; Content: Channel 2014." An end-user may thus discern upon inspection that the tuner 304c is currently or instantly being utilized to stream Channel 2014, or more precisely the Movie M2, to the mobile device 216a, as shown in FIG. 4. While such information may in many instances be useful, a particular end-user may not necessarily want or need others to become aware of the specific type of content being accessed or served by the PTR 210. Accordingly, it is contemplated that the PCS module 220 of the PTR 210 may control visibility into particular metadata associated with the transfer of the particular media content from the PTR 210 to other ones of the systems or devices of FIG. 2, so that a party other than an individual using the mobile device 216a, for example, is unable to identify or otherwise make a determination that the particular media content is or will been served by the PTR 210.

For example, in some instances, the PCS module 220 of the PTR 210 may hide or obscure or otherwise mask status of the tuner 304c allocated to enable the transfer of the Channel 2014 from the PTR 210 to the mobile device 216a. For example, instead of the metadata shown in FIG. 4 in connection with status of the tuner 304c, the PCS module 220 of the PTR 210 may obscure or otherwise mask such metadata so that the following would be displayed when viewed via the second interface 416 "Source: Tuner - - - ; Receiver: - - - ; Content: - - - ." Here, even if such information were accessible via the second interface 416, a party deemed unauthorized to view such metadata would be unable to identify or otherwise make a determination that "Tuner 304c" is allocated to serve content associated with "Channel 2014" to the "Mobile Device 216a" from the PTR 210. This is because that information is not made available for viewing at all.

As another example, instead of the metadata shown in FIG. 4 in connection with status of the tuner 304c, the PCS module 220 of the PTR 210 may obscure or otherwise mask such metadata so that the following would be displayed when viewed via the second interface 416 "Source: Tuner 304c; Receiver: Mobile Device 216a; Content: Channel 2009." Here, even if such information were accessible via the second interface 416, a party deemed unauthorized to view such metadata would be unable to identify or otherwise make a determination that "Tuner 304c" is allocated to serve content associated with "Channel 2014" to the "Mobile Device 216a" from the PTR 210. This is because, while certain information is made available for viewing via the second interface 416 in this example, that particular information, i.e., "Channel 2014," is not. Such an implementation may be referred to as "spoof" or "spoofing." Still other examples are possible, as discussed in further detail below and throughout.

Figure 5:
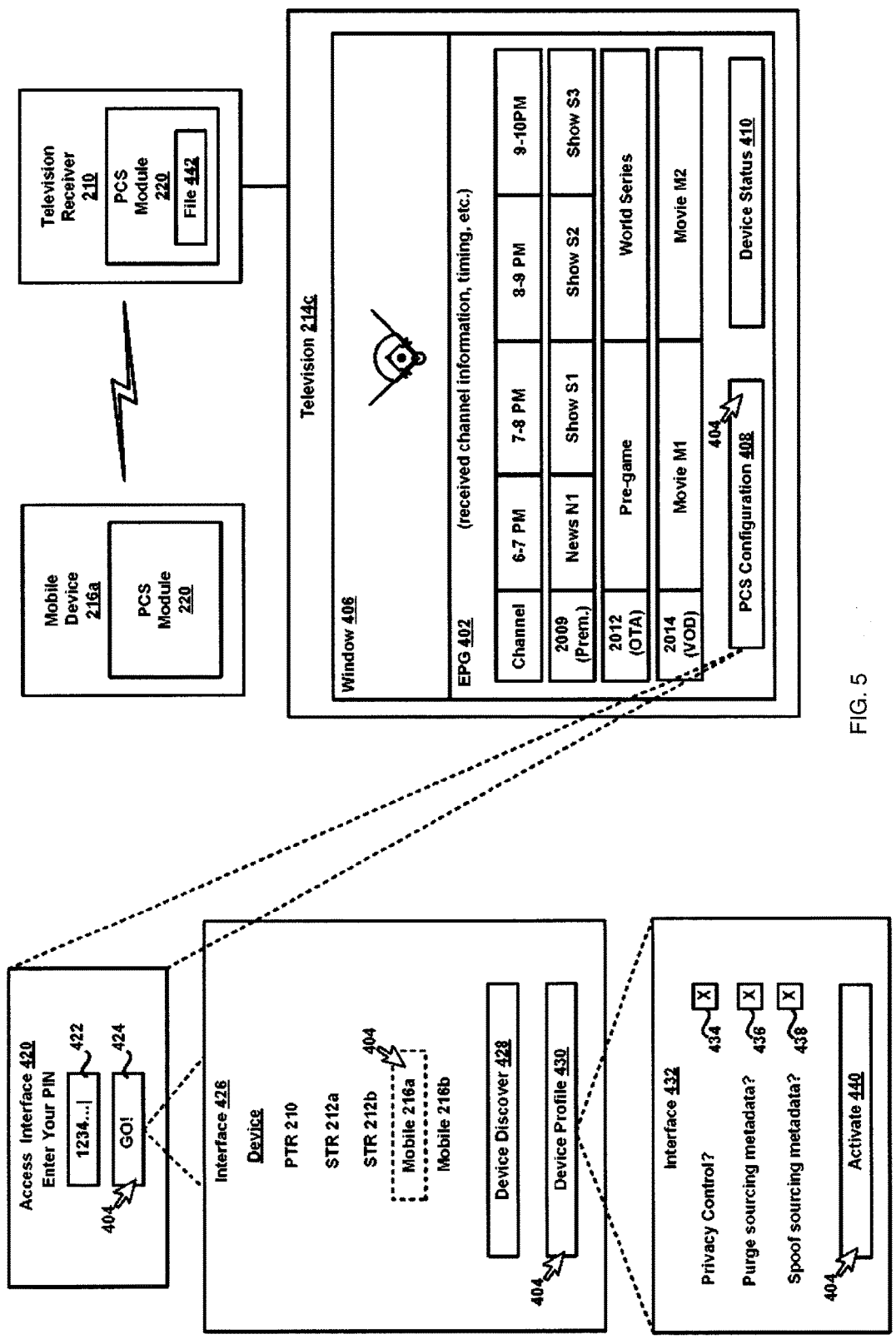
FIG. 5 shows second example aspects of the system of FIG. 2 in detail

Referring now to FIG. 5, second example aspects of the system 200 of FIG. 2 are shown in detail. In particular, and as mentioned above, the PCS module 220 of the PTR 210 may be configured to output a configuration selection 408. Here, it is contemplated that an end-user may select the configuration selection 408 to configure the PCS module 220 of the PTR 210 to obscure or mask tuner status on a device-specific basis. As part of this process, a device-specific configuration file may be generated and stored to one or more computing devices to enable the PCS module 220 of the PTR 210 to implement the various features or aspects of the disclosure.

For example, as shown in FIG. 5, an end-user may manipulate the cursor 404 to select the configuration selection 408 and, in response, the PCS module 220 of the PTR 210 may output a third interface 420 to and for presentation by the television 214c. In this example, the third interface 420 may include a prompt "Enter Your PIN" along with a data field 422 and an enter selection 424. Here, the end-user may enter into the data field 422 an alphanumeric sequence, or the like, and then select the enter selection 424 in effort to gain access to functionality associated with the configuration selection 408.

For example, assuming that the alphanumeric sequence is authenticated by the PCS module 220 of the PTR 210 following the described sequence, the PCS module 220 may output a fourth interface 426 to and for presentation by the television 214c. Here, it is contemplated that the end-user may utilize the fourth interface 426 to configure the PCS module 220 so as to implement one or more features or aspects of the present disclosure. For instance, in one example, the fourth interface 426 may include a device discover selection 428 and a device profile selection 430. The interfaces as shown in FIGS. 4-5 are just an example. Other examples may include more or fewer "selections" as desired, and may or may not be implementation-specific.

In practice, the device discover selection 428 may be selected to pair or otherwise establish a communication link or connection between the PTR 210 and any of the following devices assumed to be authorized to connect, either remotely or locally, to the home network and home automation environment as implemented by the PTR 210: STR 212a; STR 212b; Mobile Device 216a; Mobile Device 216b. When successfully paired, a corresponding device may be listed, possibly persistently, within the fourth interface 426. For example, as shown in FIG. 5, the device discover selection 428 may be selected to pair or otherwise establish a communication link or connection between the PTR 210 and the mobile device 216a, and then an indicator that identifies the mobile device 216a may be shown within the fourth interface 426. In this manner, an individual may interact with the television 214c, and ultimately the PTR 210, to program or configure at least the PCS module 220 of the PTR 210, as desired, to implement various features or aspects of the present disclosure. As mentioned above, this may, among other things, serve to entice new customers to subscribe to services as offered by a particular satellite television provider, as well as provide an incentive for existing customers to maintain their loyalty and/or relationship with the particular satellite television provider.

Next, but not necessarily so, the individual may configure the PCS module 220 of the PTR 210, for example, to implement various features or aspects of the present disclosure on a device-specific basis. For example, the indicator that identifies the mobile device 216a as shown within the fourth interface 426 may initially be selected, as indicated by intermittent line in FIG. 5, and then the device profile selection 430 may be selected to enable and define if desired (e.g., default parameter values are contemplated) via a fifth interface 432 one or more criteria or parameters for controlling visibility into particular metadata associated with the transfer of particular media content from the PTR 210 to the mobile device 216a. For example, the fifth interface 432 may permit the end-user to enable the privacy control features or aspects of the present disclosure via first checkbox 434. Such a feature may enable the PCS module 220 of the PTR 210 to make an affirmative determination at step 106 of the method 100 discussed above in connection with FIG. 1.

As another example, the fifth interface 432 may permit an end-user to permanently purge all metadata associated with the transfer of particular media content from the PTR 210 to the mobile device 216 via second check-box 436. Such a feature may ensure that anyone other than an end-user of the mobile device 216a will not be able to upon inspection or navigation through the various interfaces of the present disclosure discover or discern or identify any media content served from the PTR 210 to the mobile device 216, discussed in further detail below in connection with FIG. 6. As yet another example, the fifth interface 432 may enable an end-user to configure the PCS module 220 of the PTR 210 to "spoof" metadata associated with the transfer of particular media content from the PTR 210 to the mobile device 216 via third check-box 438. Such a feature may enable the PCS module 220 of the PTR 210 to obscure or mask metadata associated with the transfer of particular media content from the PTR 210 to the mobile device 216a by presenting information that is different than that actually associated with the transfer of particular media content from the PTR 210 to the mobile device 216a.

Upon completion of enabling or defining, via the fifth interface 432, one or more criteria or parameters for controlling visibility into particular metadata associated with the transfer of particular media content from the PTR 210 to the mobile device 216a, it is contemplated that the end-user may select an activate selection 440. The PCS module 220 of the PTR 210 may in response generate and store to at least the PTR 210 a configuration file 442, as shown in FIG. 5, that is uniquely associated with the mobile device 216a, and includes or exhibits privacy control settings or parameters consistent with that as defined or enabled via the fifth interface 432. In practice, the PCS module 220 of the PTR 210 may subsequently access or query the configuration file 442 to enable the PCS module 220 of the PTR 210 to obscure or mask metadata associated with the transfer of particular media content from the PTR 210 to the mobile device 216a in accordance with the "device-specific" principles of the present disclosure.

Figure 6:
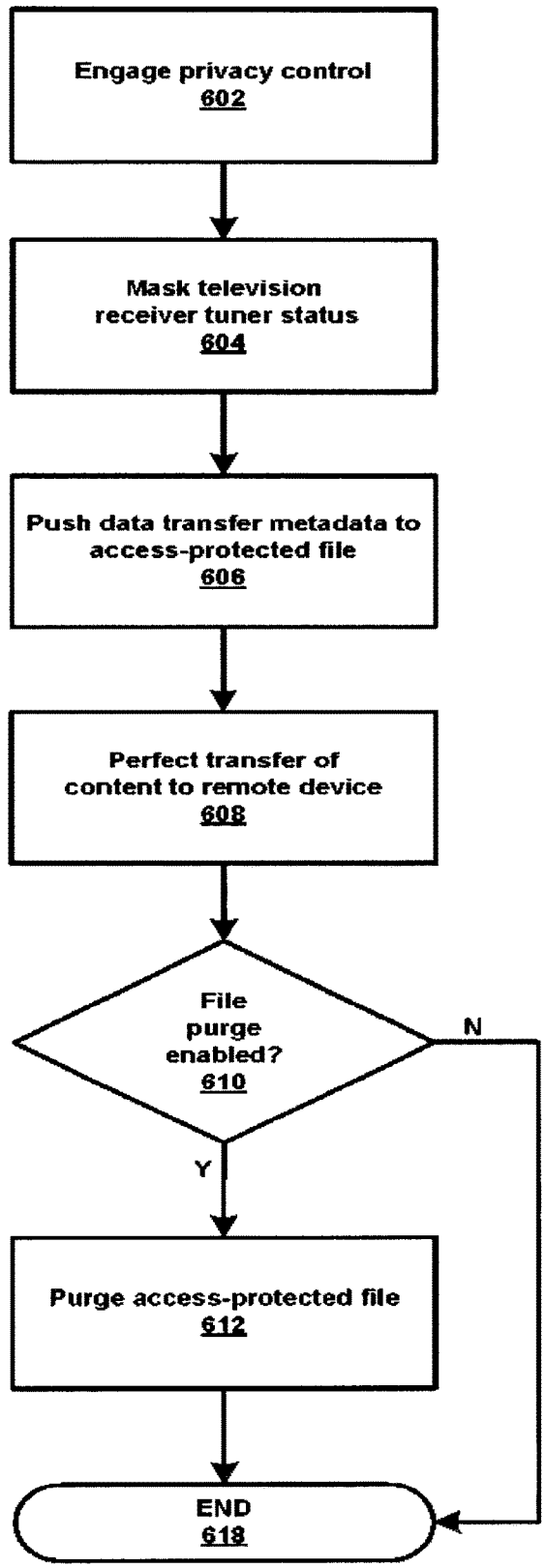
FIG. 6 shows a second example method according to the disclosure.

Referring now to FIG. 6, a second example method 600 is shown according to this disclosure. The method 600 is described as implemented by or on the PTR 210 of FIG. 2. Other examples are however possible. For example, one or more modules or steps of the example method 600 may be implemented by one or more of the other respective devices or components within the system 200 of FIG. 2 as described above. In the method 600, at step 602, the PTR 210 may engage or otherwise activate a privacy control mechanism in accordance with the present disclosure, so as to control visibility into particular metadata associated with the transfer of the particular media content from the PTR 210 to the mobile device 216a, for example, so that a party other than an individual using the mobile device 216a is unable to identify or otherwise make a determination that the particular media content is or will been served to the mobile device 216a from the PTR 210, similar to that discussed above in connection with of FIG. 1.

Next, at step 604 and to continue with the example discussed above in connection with FIG. 4, the PTR 210 may obscure or otherwise mask status of the tuner 304c allocated to enable the transfer of the Channel 2014, or more precisely the Movie M2, from the PTR 210 to the mobile device 216a. It is contemplated that such a feature may be implemented in a number of different ways. For example, instead of the metadata shown in FIG. 4 in connection with status of the tuner 304c, the PTR 210 may obscure or otherwise mask such metadata so that the following would be displayed when viewed via the second interface 416 "Source: Tuner - - - ; Receiver: - - - ; Content: - - - ." It is further contemplated that the PCS module 220 of the PTR 210 may at step 604 access the configuration file 442 shown as stored to the PCS module 220 of the PTR 210 as shown in FIG. 5, to make a determination as to whether or not the third checkbox 438 is selected or activated or engaged. When the third checkbox 438 is not selected or activated or engaged, the PTR 210 may obscure or otherwise mask such metadata so that the following would be displayed when viewed via the second interface 416 "Source: Tuner - - - ; Receiver: - - - ; Content: - - - ." Other examples are possible. For instance, when the third checkbox 438 is selected or activated or engaged, the PCS module 220 of the PTR 210 may obscure or otherwise mask such metadata so that the following would be displayed when viewed via the second interface 416 "Source: Tuner 304c; Receiver: Mobile Device 216a; Content: Channel 2009." Still other examples are possible.

Next, at step 606, the PTR 210 may at least temporarily store actual or true status of the tuner 304c allocated to enable the transfer of the Channel 2014 from the PTR 210 to the mobile device 216a within. In some example, an authorized or credentialed end-user, such as an individual in possession of a username and/or password combination that may be entered via the third interface 420 of FIG. 4, may subsequently access the configuration file 442 to determine that at a particular time/date the PTR 210 was used or utilized to access the Movie M2. Advantageously, the authorized or credentialed end-user may thus come to an understanding of such content accessed via the PTR 210 for purpose of verifying billing for access (e.g., in a video on-demand scenario), and etc.

At step 608, the PTR 210 may perfect or otherwise complete the transfer of the Movie M2 to the mobile device 216a over the network 224 for example. Such a step may be considered similar to step 108 discussed above on connection with FIG. 1. Next, process flow within the method 600 may branch back to step 610. At step 610, the PCS module 220 of the PTR 210 may access the configuration file 442 shown as stored to the PCS module 220 of the PTR 210 as shown in FIG. 5, to make a determination as to whether or not second checkbox 436 is selected or activated or engaged. When it is determined that the second checkbox 436 is not selected or activated or engaged, process flow within the method 600 may branch to termination step 618. In this way, the PTR 210 may optionally persistently store within the configuration file 442 actual or true status of the tuner 304c allocated to enable the transfer of the Channel 2014 from the PTR 210 to the mobile device 216a.

When, however, it is determined that the second checkbox 436 is selected or activated or engaged, process flow within the method 600 may branch to step 612. At step 612, the PTR 210 may purge from the configuration file 442 as initially stored actual or true status of the tuner 304c allocated to enable the transfer of the Channel 2014 from the PTR 210 to the mobile device 216a. As mentioned above, such a feature may ensure that anyone other than an end-user of the mobile device 216a will not be able to upon inspection or navigation through the various interfaces of the present disclosure discover or discern or identify any media content served from the PTR 210 to the mobile device 216.

Figure 7:
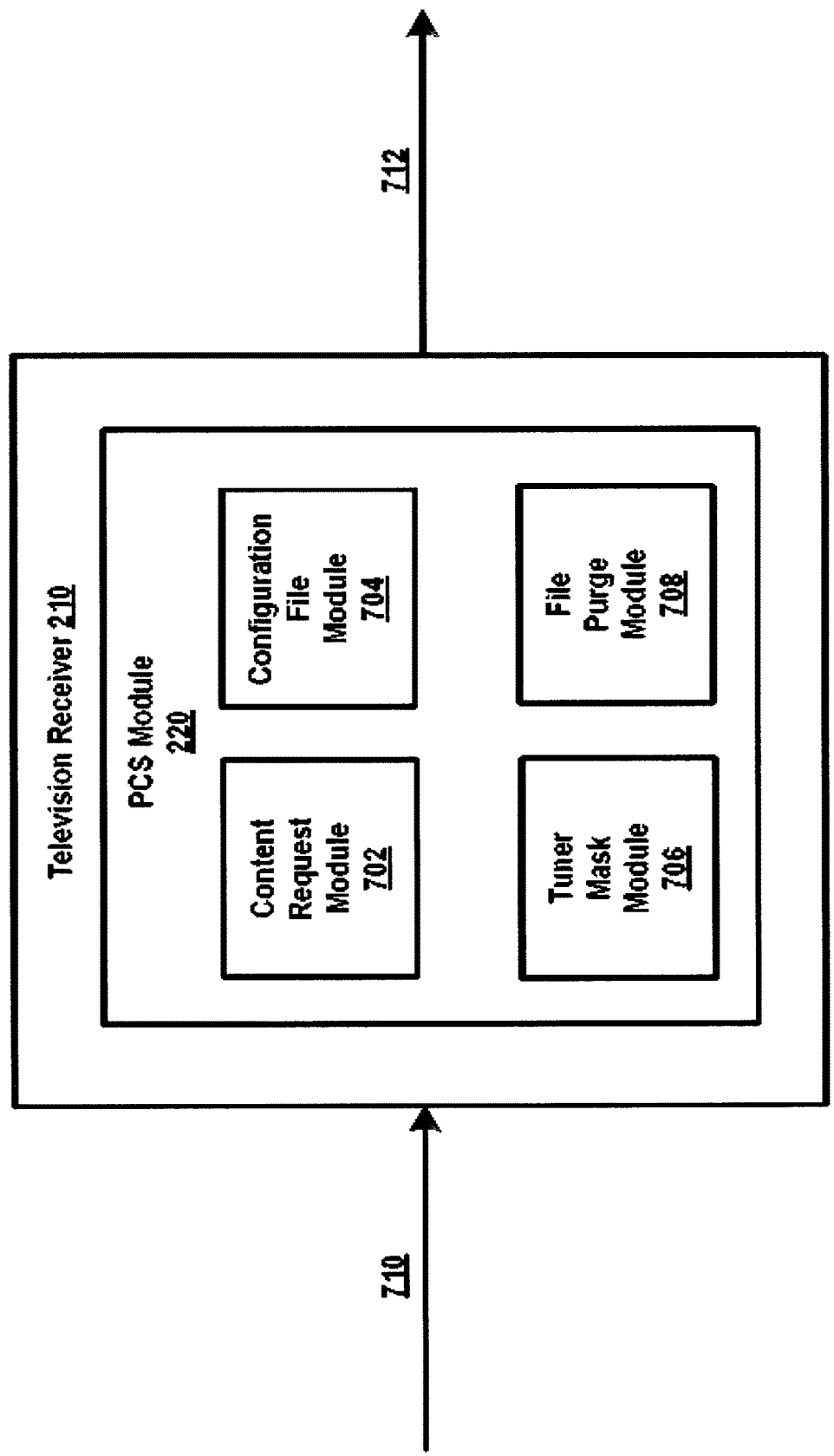
FIG. 7 shows third example aspects of the system of FIG. 2 in detail

Referring now to FIG. 7, third example aspects of the system 200 of FIG. 2 are shown in detail. In particular, FIG. 7 illustrates a number of modules of the PCS module 220 of the PTR 210 including a content request module 702, a configuration file module 704, a tuner mask module 706, and a file purge module 708. The modules as shown in FIG. 7 are just an example. Other examples may include more or fewer modules as desired, and may or may not be implementation-specific. In practice, the content request module 702 may be configured and/or arranged to receive a content request 710 from the mobile device 216a, for example, to serve particular media content to the mobile device 216a over a network or network connection. In response, the content request module 806 may query the configuration file module 704 to access the configuration file 442 that is uniquely associated with the mobile device 216a. Next, the configuration file module 704 may command the tuner mask module 706 to, when applicable (i.e., when first checkbox 434 shown in FIG. 5 is "selected"), activate a particular tuner mask, so as to control visibility into particular metadata associated with the transfer of particular media content from the PTR 210 to the mobile device 216a in a manner as discussed throughout. Next, following perfection or completion of transfer of the particular media content to the mobile device 216a via content stream 712, the file purge module 708 may or may not purge from the configuration file 442 particular metadata associated with the transfer of particular media content from the PTR 210 to the mobile device 216a. Other embodiments are possible as well.

The present disclosure is generally directed to or towards systems and methods for controlling or limiting visibility into particular metadata associated with the transfer of media content from a source device or system to a receiving device or system. It is contemplated that such a privacy control mechanism may be user-configurable on a per-device or device-specific basis. It is further contemplated that the applicability of such an implementation is far and wide-reaching. For example, it is contemplated that the features or aspects of the present disclosure may be applicable in or to a DLNA (Digital Living Network Alliance®) implementation, wherein an individual may access content off of or from a DLNA-based system or network where the same may typically report who is streaming what content from a DLNA server. Similar to the above example satellite television implementation, it is contemplated that a particular user may benefit from an ability, as provided by the features or aspects of the present disclosure, to mask or obscure or obfuscate what is being streamed between the server and the particular end point or device. Such an implementation may be beneficial and/or advantageous in many respects, many or all of which may be realized in other (e.g., satellite television) implementations as well.

For instance, the features or aspects of the present disclosure may allow or enable user privacy when viewing sensitive material in a multi-user/device environment. Additionally, or alternatively, the features or aspects of the present disclosure may allow or enable the capability to mask usage of a particular system or particular content in the case that that may be desired or necessary. Additionally, or alternatively, the features or aspects of the present disclosure may allow or enable a user to select the level of privacy which should be applied to various devices which may connect to one or more networks. Furthermore, the features or aspects of the present disclosure may be implemented as or in any of a method, a system, a computer-program product, and etc., and/or any particular combination thereof.

For instance, in one example implementation, a method may include or comprise receiving, at a television receiver, a request to access particular media content from a computing device over a network interface, streaming, by the television receiver, the particular media content to the computing device over the network interface, and obscuring, by the television receiver, particular metadata that is descriptive of the particular media content so that when output by the television receiver to a presentation device for display the particular metadata is non-descriptive of the particular media content.

In some examples, the request may include or comprise of a message, a command, etc., received by the television receiver from the computing device (e.g., a smartphone, table, PC, etc.) as part of a communication sequence in which the intent of an end-user is to stream or other gain access to media content or programming initially accessible or received by the television receiver. It is contemplated that the network interface may include or comprise an element similar to the interface 306 discussed above in connection with at least FIG. 3, and that the media content may be streamed or transferred to the computing device in substantially real-time as the media content is received by the television receiver over a satellite communication link or channel, streamed or transferred to the computing device from persistent memory dedicated to stored or recorded content, and etc.

In some examples, the particular metadata may be generated or the like in response to instantiation or commencement of the streaming or transfer of the media content to the computing device, such as that shown within the second interface 416 of FIG. 4 for instance. The particular metadata as shown within the second interface 416 of FIG. 4 though is not so limited. For instance, the particular metadata may include only a portion of that as shown within the second interface 416 of FIG. 4. For example, instead of "Source: Tuner 304*a*; Receiver: DVR database 316; Content: Channel 2009," the particular metadata may include or comprise "Source: Tuner 304*a*; Content: Channel 2009." In other examples, the particular metadata may include or comprise "Source: Tuner 304*a*; Receiver: DVR database 316; Content: Show S3." Still many other examples and/or permutations are possible as well.

Similarly, in some examples, the obfuscation or obscuring or masking of the particular metadata so that the same is generally non-descriptive when output by a television receiver, such as the PTR 210, to a presentation device, such as the mobile device 216*a* or television 214*c*, may be implemented in many different ways and/or permutations. For example, instead of "Source: Tuner 304*a*; Receiver: DVR database 316; Content: Channel 2009," the particular metadata when output for display may include or comprise "Source: - - - ; Receiver: - - - ; Content: - - - ," instead of "Source: Tuner 304*a*; Receiver: DVR database 316; Content: Channel 2009." As another example, instead of "Source: Tuner 304*a*; Receiver: DVR database 316; Content: Channel 2009," the particular metadata when output for display may include or comprise "Source: Tuner 304*a*; Receiver: DVR database 316; Content: Channel 2012."

As another example, instead of "Source: Tuner 304*a*; Receiver: DVR database 316; Content: Channel 2009," the particular metadata when output for display may include or comprise "Source: Tuner 304*b*; Receiver: DVR database 316; Content: Channel 2014." As yet another example, instead of "Source: Tuner 304*a*; Receiver: DVR database 316; Content: Channel 2009," the particular metadata when output for display may include or comprise "Source: Tuner 304*b*; Content: Channel 2014." Still many other examples and/or permutations are possible as well. In all cases though, the particular metadata when actually output for display may be masked or obscured or obfuscated so that upon inspection an unauthorized individual could not discern one or more particulars associated with the streaming or transfer of the actual particular media content to the computing device from the television receiver. Here, it is contemplated that the masked or obscured or obfuscated text or description or the like as shown within the second interface 416 of FIG. 4 for example could comprise one or more non-alphanumeric characters, such as "\\" or "- -" or the like for instance when masked or obscured or obfuscated, could comprise one or more alphanumeric characters, such as "Channel 2012" or "Show S3" or the like for instance when masked or obscured or obfuscated, and/or any permutation or combination thereof as needed or desired, possibly based upon implementation-specific details.

Still many other examples and/or embodiments are possible as well. For instance, it is contemplated that a user may interact with an end-point device (e.g., mobile device 216*a*, etc.) to change or modify device settings "on-the-fly" over the network. For example, the user may discover that the kids are at home and thus may desire to mask what he is watching. Here, it is contemplated that configuration and setup of the end-point device (and other device) could take place statically or dynamically at either end point of the transmission. In this example, it is contemplated that fifth interface 432 as shown in FIG. 5 could be modified to enable such an implementation or feature so that authorized user may perform or configure the same. In this example, the system (e.g., PCS module 220) could store and create a report of who used masking for what purposes and at what time.

The features or aspects of the present disclosure are robust and/or configurable in other ways as well. For example, one configuration item would be not to show what the user is watching—but that his device is not even connected to the streaming media—two levels—(1) yes connected with what he is watching hidden, and (2) the connection itself is hidden. False data could be presented as well. For example an end-user could with their mobile device be watching adult content but the system would indicated that cartoons are being watched, all of which could be configurable on the fly. IT will be appreciated that still many other features or aspects or implementations flow from the present disclosure.

Figure 8:
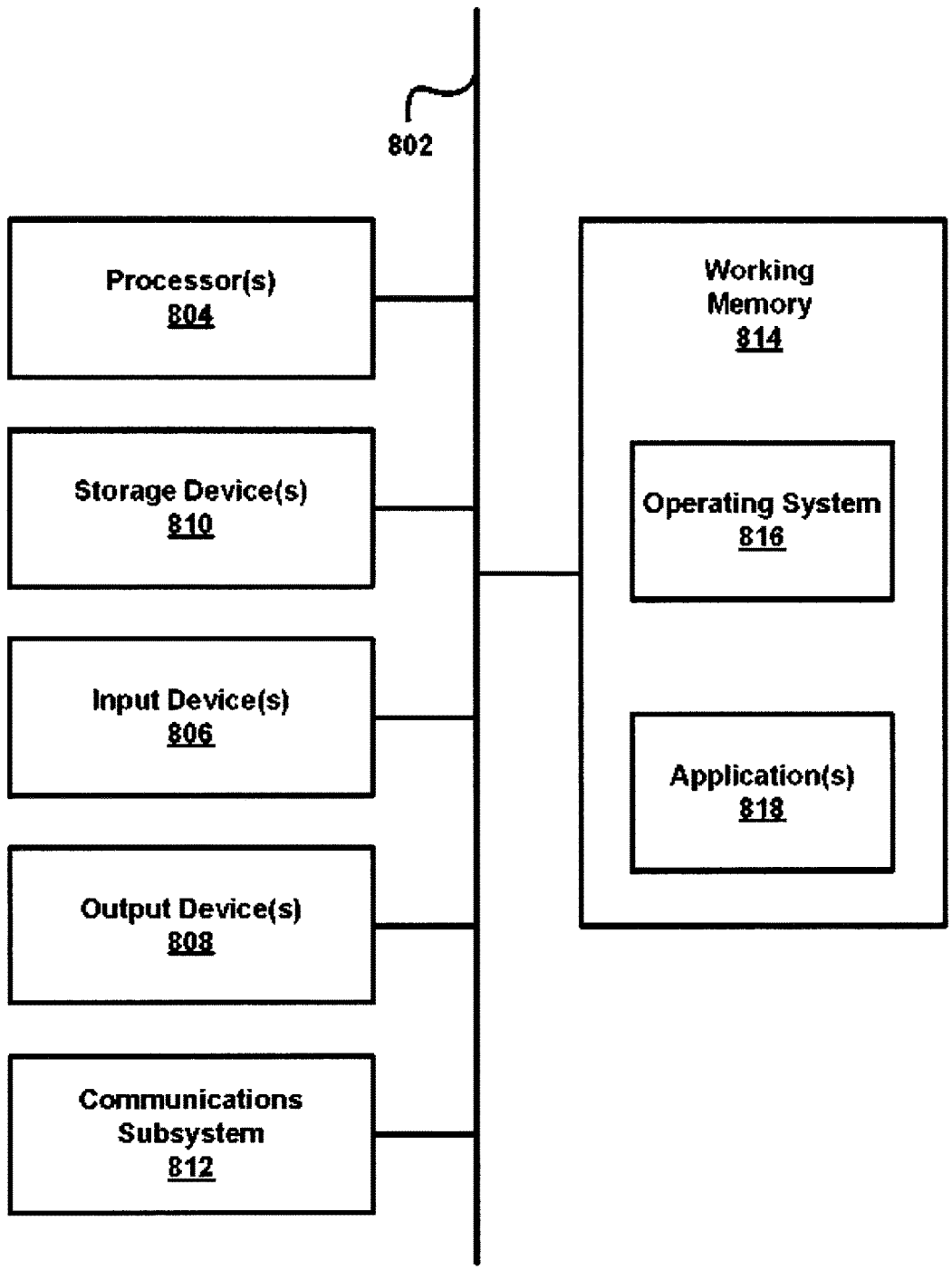
FIG. 8 shows an example computing system or device.

FIG. 8 shows an example computer system or device 800. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 800, such as any of the respective elements of at least FIG. 2. In this manner, any of one or more of the respective elements of at least FIG. 2 may be configured and/or arranged, wholly or at least partially, for controlling or limiting visibility into particular metadata associated with the transfer of media content from a source device or system to a receiving device or system, in manner consistent with that discussed above in connection with FIGS. 1-7. For example, any of one or more of the respective elements of at least FIG. 2 may be configured and/or arranged to perform and/or include instructions that, when executed, perform the method of FIG. 1 and/or FIG. 6. Still further, any of one or more of the respective elements of at least FIG. 2 may be configured to perform and/or include instructions that, when executed, instantiate and implement functionality of one or more of the PTR 210, the computing devices 216*a*-*b*, and the server(s) 218 of FIG. 2.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, and/or any other devices described herein. In many examples, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 800) to perform methods in accordance with various examples of the disclosure. According to a set of examples, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving, at a television receiver from a first computing device of a plurality of computing devices, a first request to access particular media content by transfer of the particular media content from the television receiver to the first computing device over a network interface;
accessing, by the television receiver responsive to the first request, a configuration file unique to the first computing device, the configuration file populated with a privacy control definition indicating whether visibility into particular metadata associated with the transfer of the particular media content from the television receiver to the first computing device is to be obscured from others of the plurality of computing devices;
streaming, by the television receiver responsive to the first request, the particular media content to the first computing device over the network interface by allocating one of a plurality of tuners of the television receiver to transfer the particular media content to the first computing device over the network interface, the particular metadata identifying the particular media content and the first computing device and being descriptive of the tuner of the television receiver allocated for the streaming;
receiving, at the television receiver from a second computing device of the plurality of computing devices, while the television receiver is performing the streaming, a second request to access a particular interface by which to view a status of the plurality of tuners of the television receiver, the second computing device being remote from the first computing device;
determining, by the television receiver responsive to the second request, that the second computing device is not authorized to view the particular metadata in accordance with the configuration file; and
outputting, by the television receiver for display via the second computing device responsive to the second request and in accordance with the determining, the particular metadata in such a way that the outputting comprises obscuring the particular metadata to be non-descriptive of the particular media content and the tuner of the television receiver allocated for the streaming.

2. The method of claim 1, further comprising:
detecting by the television receiver a command to enable obfuscation of the particular metadata; and
enabling by the television receiver obfuscation of the particular metadata in response to detecting the command.

3. The method of claim 1, further comprising:
detecting by the television receiver a command to enable deletion of the particular metadata in response to completed transfer of the particular media content to the first computing device; and
deleting by the television receiver the particular metadata in response to completed transfer of the particular media content to the first computing device.

4. The method of claim 1, wherein:
the configuration file indicates a type of mask selected from among a plurality of types; and
the obscuring is so that, when output by the television receiver to the second computing device for display, the particular metadata is non-descriptive of the tuner of the television receiver allocated for the streaming in accordance with applying the type of mask.

5. The method of claim 1, further comprising:
outputting for display by the second computing device the particular metadata that is non-descriptive of the tuner of the television receiver allocated for the streaming.

6. The method of claim 5, wherein the particular metadata that is non-descriptive of the particular media content comprises non-alphanumeric characters.

7. The method of claim 5, wherein the particular metadata that is non-descriptive of the particular media content comprises alphanumeric characters.

8. A television receiver, comprising:
a network interface; a processor; and a memory element communicatively coupled with and readable by the processor, and having stored therein processor-readable instructions that when executed cause the processor to:

receive a first request, from a first computing device of a plurality of computing devices, to access particular media content by transfer of the particular media content from the television receiver to the first computing device over the network interface;

access, responsive to the first request, a configuration file unique to the first computing device, the configuration file populated with a privacy control definition indicating whether visibility into particular metadata associated with the transfer of the particular media content from the television receiver to the first computing device is to be obscured from others of the plurality of computing devices;

transfer, responsive to the first request, the particular media content to the first computing device over the network interface by allocating one of a plurality of tuners of the television receiver to transfer the particular media content to the first computing device over the network interface, the particular metadata identifying the particular media content and the first computing device and being descriptive of the tuner of the television receiver allocated for the transferring;

receive, from a second computing device of the plurality of computing devices, while the television receiver is performing the streaming, a second request to access a particular interface by which to view a status of the plurality of tuners of the television receiver, the second computing device being remote from the first computing device;

determine, responsive to the second request, that the second computing device is not authorized to view the particular metadata in accordance with the configuration file; and obscure, in response to determining that the second computing device is not authorized to view the particular metadata in accordance with the configuration file, the particular metadata that is generated based upon the transfer and that is descriptive of the allocated one of the plurality of tuners so that, when output by the television receiver to the second computing device for display, the particular metadata is non-descriptive of the particular media content and the tuner.

9. The television receiver of claim 8, wherein the memory having stored therein processor-readable instructions that when executed cause the processor to: obscure the particular metadata that is generated based upon the transfer so that, when output by the television receiver to the second computing device for display, the particular metadata is further non-descriptive of the first computing device.

10. The television receiver of claim 8, wherein the memory having stored therein processor-readable instructions that when executed cause the processor to:
   detect a command to enable obfuscation of the particular metadata; and
   in response to the command, enable obfuscation of the particular metadata.

11. The television receiver of claim 8, wherein the memory having stored therein processor-readable instructions that when executed cause the processor to: detect a command to enable deletion of the particular metadata upon completed transfer of the particular media content to the first computing device; and delete the particular metadata upon completed transfer of the particular media content to the first computing device.

12. The television receiver of claim 8, wherein: the configuration file indicates a type of mask selected from among a plurality of types so that when output by the television receiver to the second computing device for display the particular metadata is non-descriptive in accordance with applying the type of mask.

13. The television receiver of claim 8, wherein the memory having stored therein processor-readable instructions that when executed cause the processor to: output for display by the second computing device the particular metadata that is non-descriptive of the particular media content.

14. The television receiver of claim 13, wherein the memory having stored therein processor-readable instructions that when executed cause the processor to:
   output the particular metadata that is non-descriptive of the particular media content and that comprises non-alphanumeric characters.

15. The television receiver of claim 13, wherein the memory having stored therein processor-readable instructions that when executed cause the processor to:
   output the particular metadata that is non-descriptive of the particular media content and that comprises alphanumeric characters.

* * * * *